United States Patent
Niemi et al.

(10) Patent No.: US 11,968,614 B2
(45) Date of Patent: Apr. 23, 2024

(54) APPARATUSES AND METHODS FOR HANDLING ACCESS TYPE RESTRICTION INFORMATION

(71) Applicant: MediaTek Singapore Pte. Ltd., Singapore (SG)

(72) Inventors: Marko Niemi, Oulu (FI); Matti Moisanen, Oulu (FI)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 255 days.

(21) Appl. No.: 16/385,261

(22) Filed: Apr. 16, 2019

(65) Prior Publication Data
US 2019/0320381 A1 Oct. 17, 2019

Related U.S. Application Data

(60) Provisional application No. 62/658,639, filed on Apr. 17, 2018.

(51) Int. Cl.
*H04W 48/16* (2009.01)
*H04W 8/08* (2009.01)
(Continued)

(52) U.S. Cl.
CPC ........... *H04W 48/16* (2013.01); *H04W 8/08* (2013.01); *H04W 8/183* (2013.01); *H04W 8/24* (2013.01); *H04W 60/00* (2013.01); *H04W 76/11* (2018.02)

(58) Field of Classification Search
CPC ....... H04W 48/16; H04W 8/08; H04W 8/183; H04W 8/24; H04W 76/11; H04W 60/00
(Continued)

(56) References Cited

U.S. PATENT DOCUMENTS

| 7,920,846 B2 | 4/2011 | Wang et al. |
| 8,688,970 B2 * | 4/2014 | Bachmann ............ H04L 63/029 |
| | | 713/153 |

(Continued)

FOREIGN PATENT DOCUMENTS

| CN | 1671240 A | 9/2005 |
| CN | 101511076 A | 8/2009 |

(Continued)

OTHER PUBLICATIONS

3GPP TS 24.501, Non-Access-Stratum (NAS) protocol for 5G System (5GS); Stage 3, (Release 15) V1.0.0 (Mar. 2018), pp. 102-103. (Year: 2018).*

(Continued)

*Primary Examiner* — Rasheed Gidado
(74) *Attorney, Agent, or Firm* — McClure, Qualey & Rodack, LLP

(57) ABSTRACT

A User Equipment (UE) including a wireless transceiver and a controller is provided. The controller obtains information indicating that the UE is not allowed to access a 3GPP core network over which one or both or none of the 3GPP access network and the non-3GPP access network. Also, the controller refrains the UE from accessing the 3GPP core network over the indicated one or both of the 3GPP access network and the non-3GPP access network in response to the information indicating that the UE is not allowed to access the 3GPP core network over one or both of the 3GPP access network and the non-3GPP access network.

16 Claims, 5 Drawing Sheets

(51) Int. Cl.
*H04W 8/18* (2009.01)
*H04W 8/24* (2009.01)
*H04W 60/00* (2009.01)
*H04W 76/11* (2018.01)

(58) Field of Classification Search
USPC .......................................................... 370/329
See application file for complete search history.

(56) References Cited

U.S. PATENT DOCUMENTS

| | | | |
|---|---|---|---|
| 9,949,166 B2 | 4/2018 | Sirotkin et al. | |
| 10,111,166 B2 | 10/2018 | Lee et al. | |
| 10,412,666 B2 | 9/2019 | Hedberg et al. | |
| 10,694,418 B2* | 6/2020 | Drevon | H04W 28/0205 |
| 11,271,937 B2 | 3/2022 | Wang et al. | |
| 2008/0305825 A1 | 12/2008 | Shaheen | |
| 2010/0029248 A1 | 2/2010 | Shi et al. | |
| 2014/0355417 A1* | 12/2014 | Kim | H04W 36/165 370/221 |
| 2014/0355541 A1 | 12/2014 | Liu et al. | |
| 2015/0245408 A1* | 8/2015 | Watanabe | H04W 76/19 370/329 |
| 2016/0183085 A1* | 6/2016 | Yerrabommanahalli | H04L 63/107 713/153 |
| 2016/0294682 A1 | 10/2016 | Bi et al. | |
| 2017/0094512 A1* | 3/2017 | Kiss | H04W 12/06 |
| 2017/0134986 A1 | 5/2017 | Jeong et al. | |
| 2018/0063774 A1* | 3/2018 | Gupta | H04W 48/18 |
| 2018/0376384 A1* | 12/2018 | Youn | H04W 36/14 |
| 2019/0021064 A1 | 1/2019 | Ryu et al. | |
| 2019/0053252 A1* | 2/2019 | Park | H04L 47/826 |
| 2019/0150056 A1 | 5/2019 | Xu et al. | |
| 2019/0174449 A1* | 6/2019 | Shan | H04W 60/00 |

FOREIGN PATENT DOCUMENTS

| | | | | |
|---|---|---|---|---|
| CN | 104067536 A | 9/2014 | | |
| CN | 104639451 A | 5/2015 | | |
| CN | 104871578 A | 8/2015 | | |
| CN | 106664596 A | 5/2017 | | |
| CN | 107517489 A | 12/2017 | | |
| CN | 107534994 A | 1/2018 | | |
| WO | WO-2010013914 A2 | * | 2/2010 | H04L 63/0876 |
| WO | WO-2016177223 A1 | * | 11/2016 | |
| WO | 2017187358 A1 | | 11/2017 | |
| WO | 2018/008944 A1 | | 1/2018 | |
| WO | 2018/038490 A1 | | 3/2018 | |

OTHER PUBLICATIONS

"Rajavelsamy et al., Security Aspects of Inter-Access System Mobility Between 3GPP and Non-3GPP Networks, 2008 3rd International Conference on Communication Systems Software and Middleware and Workshops (COMSWARE '08), pp. 1-5" (Year: 2008).*
Chinese language office action dated Aug. 6, 2020, issued in application No. TW 108113167.
"TS 23.501: Mobility Restriction and non-3GPP access;" SA WG2 Meeting #119; Feb. 2017; pp. 1-3.
"3rd Generation Partnership Project; Technical Specification Group Core Network and Terminals; 5G System—Phase 1; CT WG1 Aspects (Release 15);" 3. 3GPP TR 24.890 V15.1.0; Mar. 2018; pp. 1-309.
Chinese language office action dated Aug. 30, 2022, issued in application No. CN 201980001226.4.
Vivo; "Independent 5GMM modes over the 3GPP access and the non-3GPP access;" 3GPP TSG-CT WG1 Meeting #105; Aug. 2017; pp. 1-3.
Mediatek Inc., et al.; "Allow UEs to proceed with CSFB after TAU Reject #9,#10 or #40;" 3GPP TSG-CT WG1 Meeting #92; Jun. 2015; pp. 1-8.
Chinese language office action dated Apr. 19, 2023, issued in application No. CN 201980001226.4.
LG Electronics; "Implicit de-registration over non-3GPP access;" 3GPP TSG-CT WG1 Meeting #109; Mar. 2018; pp. 1-14.
Ericsson; "UE Access and Mobility Policies;" 3GPP TSG-CT WG3 Meeting #91; Aug. 2017; pp. 1-3.
Chinese language office action dated Oct. 17, 2023, issued in application No. CN 201980001226.4.
Mediatek Inc.; "Cause values for mobility/periodic registration failure;" 3GPP TSG-CT WG1 Meeting #110; Apr. 2018; pp. 1-3.

* cited by examiner

APPARATUSES AND METHODS FOR HANDLING ACCESS TYPE RESTRICTION INFORMATION

CROSS REFERENCE TO RELATED APPLICATIONS

This Application claims priority of U.S. Provisional Application No. 62/658,639, filed on Apr. 17, 2018, the entirety of which is incorporated by reference herein.

BACKGROUND OF THE APPLICATION

Field of the Application

The application generally relates to mobile communications, and more particularly, to apparatuses and methods for handling access type restriction information.

Description of the Related Art

In a typical mobile communication environment, a User Equipment (UE) (also called Mobile Station (MS)), such as a mobile telephone (also known as a cellular or cell phone), or a tablet Personal Computer (PC) with wireless communications capability, may communicate voice and/or data signals with one or more service networks. The wireless communications between the UE and the service networks may be performed using various Radio Access Technologies (RATs), such as Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, etc.

These wireless technologies have been adopted for use in various telecommunication standards to provide a common protocol that enables different wireless devices to communicate on a municipal, national, regional, and even global level. An example of an emerging telecommunication standard is the 5G New Radio (NR). The 5G NR is a set of enhancements to the LTE mobile standard promulgated by the Third Generation Partnership Project (3GPP). It is designed to better support mobile broadband Internet access by improving spectral efficiency, reducing costs, and improving services.

According to the 3GPP specifications and/or requirements in compliance with the 5G NR technology, a User Equipment (UE) may access a 5G core network over 3GPP access or non-3GPP access. However, there may be situations where the 5G network may want to restrict the use of certain access type (e.g., 3GPP access or non-3GPP access) or to steer the UE to use an alternative access type, but current 3GPP specifications and/or requirements in compliance with the 5G NR technology do not define any way for the 5G network to inform the UE of such information.

BRIEF SUMMARY OF THE APPLICATION

In order to solve the aforementioned problem, the present application proposes specific ways for a 3GPP core network to inform a UE of the access type restriction information.

In one aspect of the application, a UE comprising a wireless transceiver and a controller is provided. The wireless transceiver is configured to perform wireless transmission and reception to and from one or both of a 3GPP access network and a non-3GPP access network. The controller is configured to obtain information indicating that the UE is not allowed to access a 3GPP core network over which one or both or none of the 3GPP access network and the non-3GPP access network, and refrain the UE from accessing the 3GPP core network over the indicated one or both of the 3GPP access network and the non-3GPP access network in response to the information indicating that the UE is not allowed to access the 3GPP core network over one or both of the 3GPP access network and the non-3GPP access network.

In another aspect of the application, a method for handling access type restriction information, executed by a UE communicatively connected to a 3GPP core network over one or both of a 3GPP access network and a non-3GPP access network, is provided. The method comprises the steps of: obtaining information indicating that the UE is not allowed to access the 3GPP core network over which one or both or none of the 3GPP access network and the non-3GPP access network; and refraining the UE from accessing the 3GPP core network over the indicated one or both of the 3GPP access network and the non-3GPP access network in response to the information indicating that the UE is not allowed to access the 3GPP core network over one or both of the 3GPP access network and the non-3GPP access network.

Other aspects and features of the present application will become apparent to those with ordinarily skill in the art upon review of the following descriptions of specific embodiments of the UEs and methods method for handling access type restriction information.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
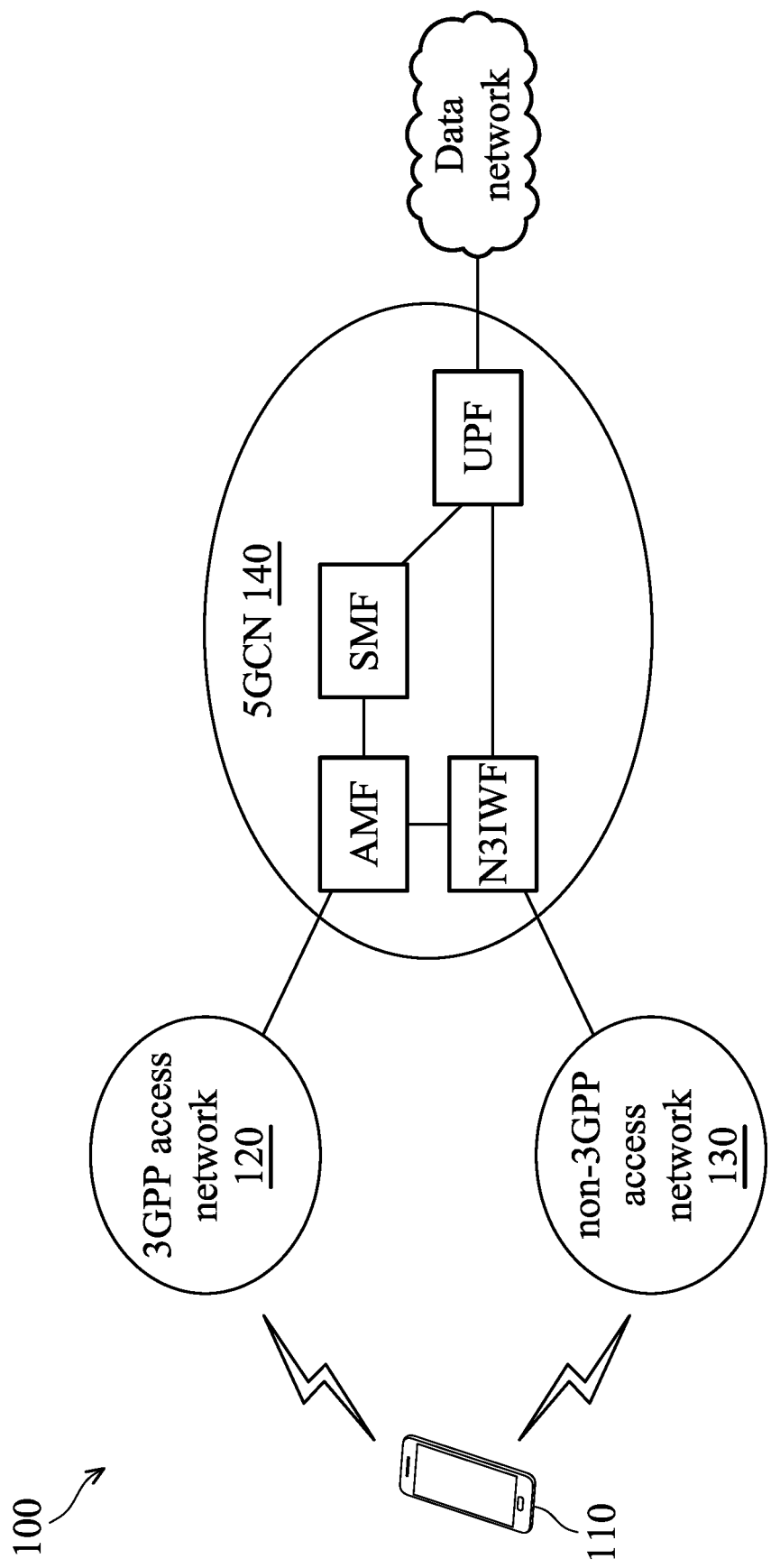
FIG. 1 is a block diagram of a wireless communication environment according to an embodiment of the application.

FIG. 1 is a block diagram of a wireless communication environment according to an embodiment of the application.

The wireless communication environment 100 includes a UE 110, a 3GPP access network 120, a non-3GPP access network 130, and a core network which is exemplified by a 5G Core Network (5GCN) 140.

The UE 110 may be a feature phone, a smartphone, a tablet PC, a laptop computer, or any wireless communication device supporting the RATs utilized by the 3GPP access network 120, the non-3GPP access network 130, and the 5GCN 140.

The UE 110 may be wirelessly connected to the 5GCN 140 via the 3GPP access network 120 and/or the non-3GPP access network 130. For example, the UE 110 may communicate with the 5GCN 140 via the 3GPP access network 120 and/or the non-3GPP access network 130, to obtain access type restriction information, i.e., information indicating that the UE 110 is not allowed to access the 5GCN 140 over which one or both or none of the 3GPP access network 120 and the non-3GPP access network 130.

The 3GPP access network 120 is an access network utilizing one of the RATs specified by 3GPP. For example, the 3GPP access network 120 may be a GSM EDGE Radio Access Network (GERAN), Universal Terrestrial Radio Access Network (UTRAN), Evolved UTRAN (E-UTRAN), or Next Generation Radio Access Network (NG-RAN).

For example, if the 3GPP access network 120 is an E-UTRAN, it may include at least one evolved NodeB (eNB) (e.g., macro eNB, femto eNB, or pico eNB).

If the 3GPP access network 120 is an NG-RAN, it may include one or more cellular stations, such as gNBs, which support high frequency bands (e.g., above 24 GHz), and each gNB may further include one or more Transmission Reception Points (TRPs), wherein each gNB or TRP may be referred to as a 5G cellular station. Some gNB functions may be distributed across different TRPs, while others may be centralized, leaving the flexibility and scope of specific deployments to fulfill the requirements for specific cases.

The non-3GPP access network 130 is an access network utilizing one RAT not specified by 3GPP. For example, the non-3GPP access network 130 may be a Wireless-Fidelity (Wi-Fi) network, a WiMAX network, a CDMA network, or a fixed network (e.g., a Digital Subscriber Line (DSL) network).

Each of the 3GPP access network 120 and the non-3GPP access network 130 is capable of processing radio signals, terminating radio protocols, and connecting the UE 110 with the 5GCN 140, while the 5GCN 140 is responsible for performing mobility management, network-side authentication, and interfaces with a public/external data network (e.g., the Internet).

The 5GCN 140 may also be called a Next Generation Core Network (NG-CN) in 5G NR, and it may support various network functions, including an AMF, a Session Management Function (SMF), a User Plane Function (UPF), a Policy Control Function (PCF), an Application Function (AF), an Authentication Server Function (AUSF), and a Non-3GPP Inter-Working Function (N3IWF), wherein each network function may be implemented as a network element on a dedicated hardware, or as a software instance running on a dedicated hardware, or as a virtualized function instantiated on an appropriate platform, e.g., a cloud infrastructure.

The AMF provides UE-based authentication, authorization, mobility management, etc. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functions per session. The AF provides information on the packet flow to PCF responsible for policy control in order to support Quality of Service (QoS). Based on the information, the PCF determines policies about mobility and session management to make the AMF and the SMF operate properly. The AUSF stores data for authentication of UEs, while the UDM stores subscription data of UEs. The N3IWF may enable the UE 110 to attach to the 5GCN 140 either via trusted non-3GPP access or via untrusted non-3GPP access.

It should be understood that the 5G system depicted in FIG. 1 is for illustrative purposes only and is not intended to limit the scope of the application.

Figure 2:
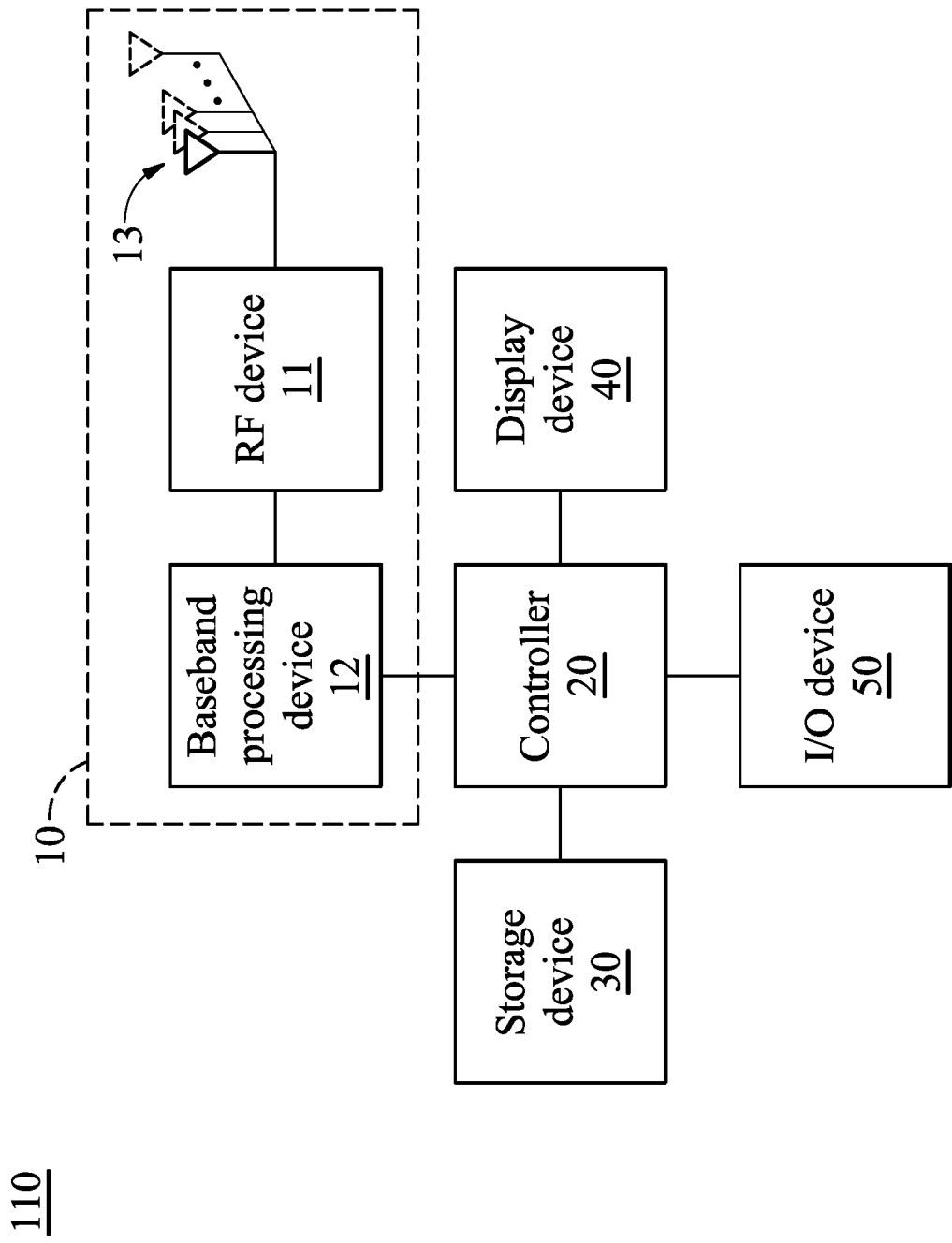
FIG. 2 is a block diagram illustrating the UE 110 according to an embodiment of the application.

FIG. 2 is a block diagram illustrating the UE 110 according to an embodiment of the application.

The UE 110 includes a wireless transceiver 10, a controller 20, a storage device 30, a display device 40, and an Input/Output (I/O) device 50.

The wireless transceiver 10 is configured to perform wireless transmission and reception to and from the 3GPP access network 120 and/or the non-3GPP access network 130. Specifically, the wireless transceiver 10 includes a Radio Frequency (RF) device 11, a baseband processing device 12, and antenna(s) 13, wherein the antenna(s) 13 may include one or more antennas for beamforming. The baseband processing device 12 is configured to perform baseband signal processing and control the communications between subscriber identity card(s) (not shown) and the RF device 11. The baseband processing device 12 may contain multiple hardware components to perform the baseband signal processing, including Analog-to-Digital Conversion (ADC)/Digital-to-Analog Conversion (DAC), gain adjusting, modulation/demodulation, encoding/decoding, and so on. The RF device 11 may receive RF wireless signals via the antenna(s) 13, convert the received RF wireless signals to baseband signals, which are processed by the baseband processing device 12, or receive baseband signals from the baseband processing device 12 and convert the received baseband signals to RF wireless signals, which are later transmitted via the antenna(s) 13. The RF device 11 may also contain multiple hardware devices to perform radio frequency conversion. For example, the RF device 11 may include a mixer to multiply the baseband signals with a carrier oscillated in the radio frequency of the supported cellular technologies, wherein the radio frequency may be 900 MHz, 1900 MHz or 2100 MHz utilized in 3G (e.g., WCDMA) systems, or 900 MHz, 2100 MHz, or 2.6 GHz utilized in 4G (e.g., LTE) systems, or any radio frequency (e.g., 30 GHz-300 GHz for mmWave) utilized in 5G (e.g., NR) systems, or another radio frequency, depending on the RAT in use.

The controller 20 may be a general-purpose processor, a Micro Control Unit (MCU), an application processor, a Digital Signal Processor (DSP), or the like, which includes various circuits for providing the functions of data processing and computing, controlling the wireless transceiver 10 for wireless transmission and reception to and from the 3GPP access network 120 and/or the non-3GPP access network 130, enabling the storage device 30 and storing and retrieving data (e.g., access type restriction information) to and from the storage device 30, sending a series of frame data (e.g. representing text messages, graphics, images, etc.) to the display device 40, and receiving/outputting signals from/to the I/O device 50.

In particular, the controller 20 coordinates the aforementioned operations of the wireless transceiver 10, the storage device 30, the display device 40, and the I/O device 50 for performing the method for handling access type restriction information.

In another embodiment, the controller 20 may be incorporated into the baseband processing device 12, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 is a non-transitory machine-readable storage medium which may include any combination of the following: a Universal Subscriber Identity Module (USIM), a non-volatile memory (e.g., a FLASH memory or a Non-Volatile Random Access Memory (NVRAM)), a magnetic storage device (e.g., a hard disk or a magnetic tape), and an optical disc. A USIM may contain USIM application containing functions, file structures, and elementary files, and it may be technically realized in the form of a physical card or in the form of a programmable SIM (e.g., eSIM) that is embedded directly into the UE 110. The storage device 30 may be used for storing data, including access type restriction information, instructions and/or program code of applications, communication protocols, and/or the method for handling access type restriction information.

In particular, the storage device 30 may include a data space specific for access type restriction information. For example, the data space may refer to an Elementary File (EF) in a USIM for storing access type restriction information. Alternatively, the data space may refer to memory block in a non-volatile memory for storing access type restriction information.

The access type restriction information may be stored permanently or only for a period of time guarded by a timer, wherein the timer value may be fixed or assigned by the 5GCN 140. The access type restriction information may be considered valid until the UE 110 is powered off, or until the USIM is changed, or until the location of the UE 110 is changed (e.g., the UE 110 has moved to a different cell, tracking area, registration area, or Public Land Mobile Network (PLMN)).

The display device 40 may be a Liquid-Crystal Display (LCD), a Light-Emitting Diode (LED) display, or an Electronic Paper Display (EPD), etc., for providing a display function. Alternatively, the display device 40 may further include one or more touch sensors disposed thereon or thereunder for sensing touches, contacts, or approximations of objects, such as fingers or styluses.

The I/O device 50 may include one or more buttons, a keyboard, a mouse, a touch pad, a video camera, a microphone, and/or a speaker, etc., to serve as the Man-Machine Interface (MMI) for interaction with users, such as receiving user inputs, and outputting prompts to users.

It should be understood that the components described in the embodiment of FIG. 2 are for illustrative purposes only and are not intended to limit the scope of the application. For example, the UE 110 may include more components, such as a power supply, or a Global Positioning System (GPS) device, wherein the power supply may be a mobile/replaceable battery providing power to all the other components of the UE 110, and the GPS device may provide the location information of the UE 110 for use of some location-based services or applications.

Figure 3:
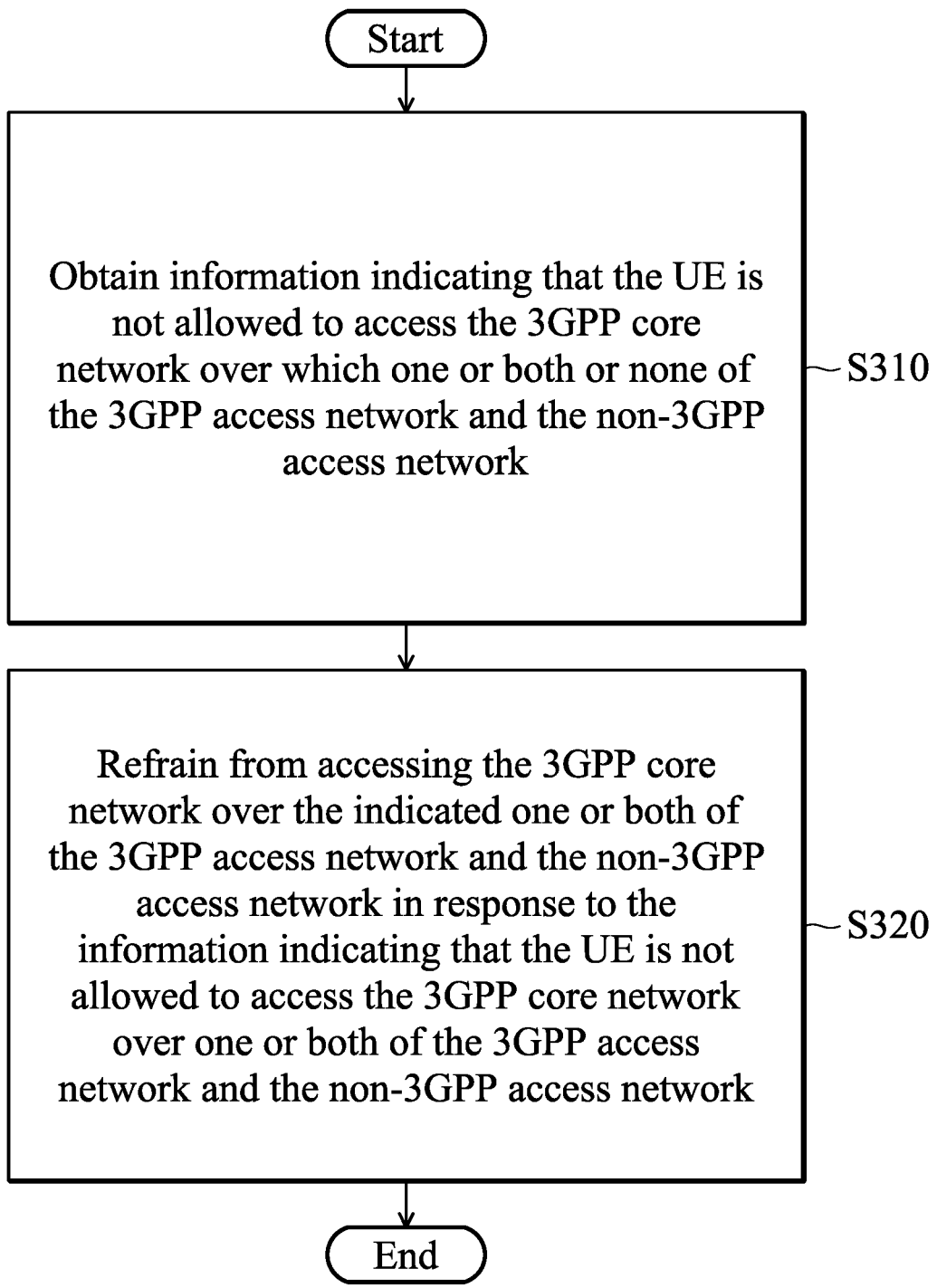
FIG. 3 is a flow chart illustrating the method for handling access type restriction information according to an embodiment of the application.

FIG. 3 is a flow chart illustrating the method for handling access type restriction information according to an embodiment of the application.

In this embodiment, the method for handling access type restriction information is executed by a UE (e.g., the UE 110) which is communicatively connected to a 3GPP core network (e.g., the 5GCN 140) via 3GPP access (e.g., the 3GPP access network 120) or non-3GPP access (e.g., the non-3GPP access network 130).

To begin with, the UE obtains information (i.e., the access type restriction information) indicating that the UE is not allowed to access the 3GPP core network over which one or both or none of the 3GPP access network and the non-3GPP access network (step S310).

The information may be obtained from a response message of a registration procedure or a configuration update command received from the 3GPP core network, or from subscription data stored in the UE.

In one embodiment, if the 3GPP core network is a 5GCN, the information may refer to a 5GMM cause Information Element (IE) included in a Registration Reject message of a 5G Mobility Management (MM) Registration procedure.

For example, the 5GMM cause IE may be set to a value (e.g., #72) to indicate "Non-3GPP access to 5GCN not allowed".

In another embodiment, if the 3GPP core network is a 5GCN, the information may refer to a 5G registration result IE included in a Registration Accept message of a 5G MM Registration procedure.

For example, the 5G registration result IE may be set to a value to indicate "3GPP access allowed only", "non-3GPP access allowed only", or "both 3GPP access and non-3GPP access allowed".

In another embodiment, if the 3GPP core network is a 5GCN, the information may refer to a procedure result type included in a Configuration Update Command message of a 5G Configuration Update procedure, wherein the procedure result type may serve a similar purpose (i.e., indicating the restriction or allowance of each access type) of the 5G registration result IE.

In another embodiment, if the information is obtained from subscription data stored in the UE, the subscription data may refer to a Universal Subscriber Identity Module (USIM) file stored in a USIM or in a programmable SIM (e.g., eSIM) that is embedded directly into the UE, and the USIM file may be further updated Over-The-Air (OTA) by the operator.

If the information is obtained from a response message of a registration procedure or a configuration update command received from the 3GPP core network, the information may be stored in the UE permanently or only for a period of time guarded by a timer with a timer length fixed or assigned by the 3GPP core network.

Subsequent to step S310, the UE refrains from accessing the 3GPP core network over the indicated one or both of the 3GPP access network and the non-3GPP access network in response to the information indicating that the UE is not allowed to access the 3GPP core network over one or both of the 3GPP access network and the non-3GPP access network (step S320), and the method ends.

Specifically, the UE may disable the N1 mode capability for the indicated one or both of the 3GPP access network and the non-3GPP access network, so as to refrain from accessing the 3GPP core network over the indicated one or both of the 3GPP access network and the non-3GPP access network.

For example, if the 3GPP core network is a 5GCN and the information refers to a 5GMM cause IE included in a Registration Reject message, which is set to a value (e.g., #72) to indicate "Non-3GPP access to 5GCN not allowed", then the UE is refrained/stopped from accessing the 3GPP core network over the non-3GPP access network.

If the 3GPP core network is a 5GCN and the information refers to a 5G registration result IE included in a Registration Accept message, which is set to a value to indicate "3GPP access allowed only", "non-3GPP access allowed only", or "both 3GPP access and non-3GPP access allowed", then the UE is refrained/stopped from accessing the 3GPP core network over the non-3GPP access network, the 3GPP access network, or none of the non-3GPP access network and the 3GPP access network, respectively.

Moreover, the UE may determine/consider the information is valid until the UE is powered off, or until the USIM is changed, or until the location of the UE is changed (e.g., the UE 110 has moved to a different cell, tracking area, registration area, or Public Land Mobile Network (PLMN)).

Please note that, in one embodiment, the 5GCN may change a previously assigned access type restriction information by sending another configuration update command or by a subsequent registration procedure.

Figure 4:
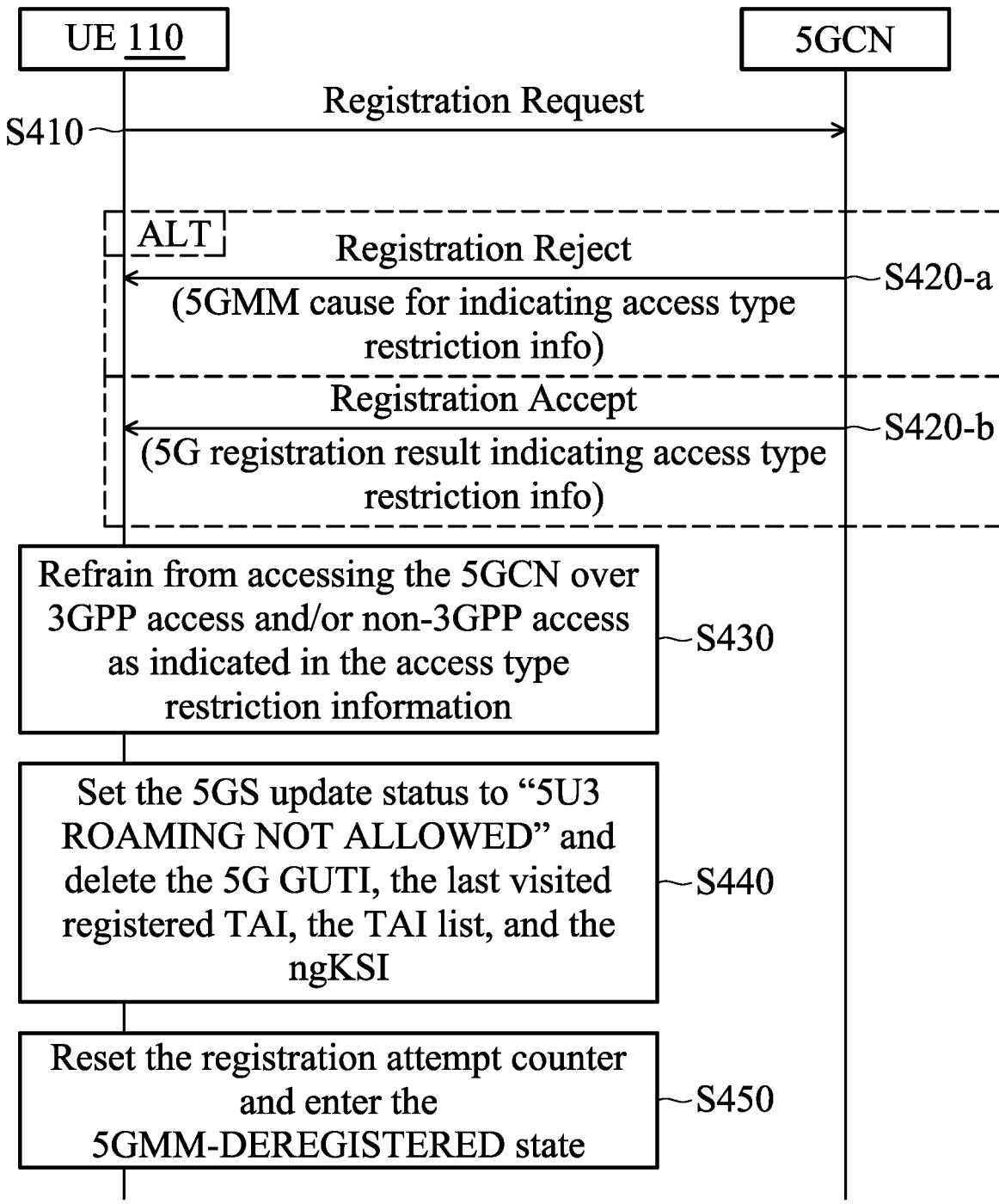
FIG. 4 is a message sequence chart illustrating the handling of access type restriction information according to an embodiment of the application.

FIG. 4 is a message sequence chart illustrating the handling of access type restriction information according to an embodiment of the application.

To begin with, the UE 110 sends a Registration Request message to the 5GCN (step S410), and in response, the UE 110 may receive a Registration Reject message or a Registration Accept message from the 5GCN (step S420-a/S420-b).

In particular, each of the Registration Reject message and the Registration Accept message may include access type restriction information. For example, the Registration Reject message may include a 5GMM cause IE indicating the restriction or allowance of each access types. The Registration Accept message may include a 5G registration result IE indicating the restriction or allowance of each access types.

In response to receiving a Registration Reject/Accept message including access type restriction information, the UE 110 is refrained/stopped from accessing the 5GCN over 3GPP access and/or non-3GPP access as indicated in the access type restriction information (step S430).

Next, the UE 110 sets the 5GS update status to "5U3 ROAMING NOT ALLOWED" and deletes the 5G Globally Unique Temporary UE Identity (GUTI), the last visited registered Tracking Area Identity (TAI), the TAI list, and the Key Set Identifier for Next Generation Radio Access Network (ngKSI) (step S440).

Additionally, the UE 110 resets the registration attempt counter and enters the 5GMM-DEREGISTERED state (step S450).

Figure 5:
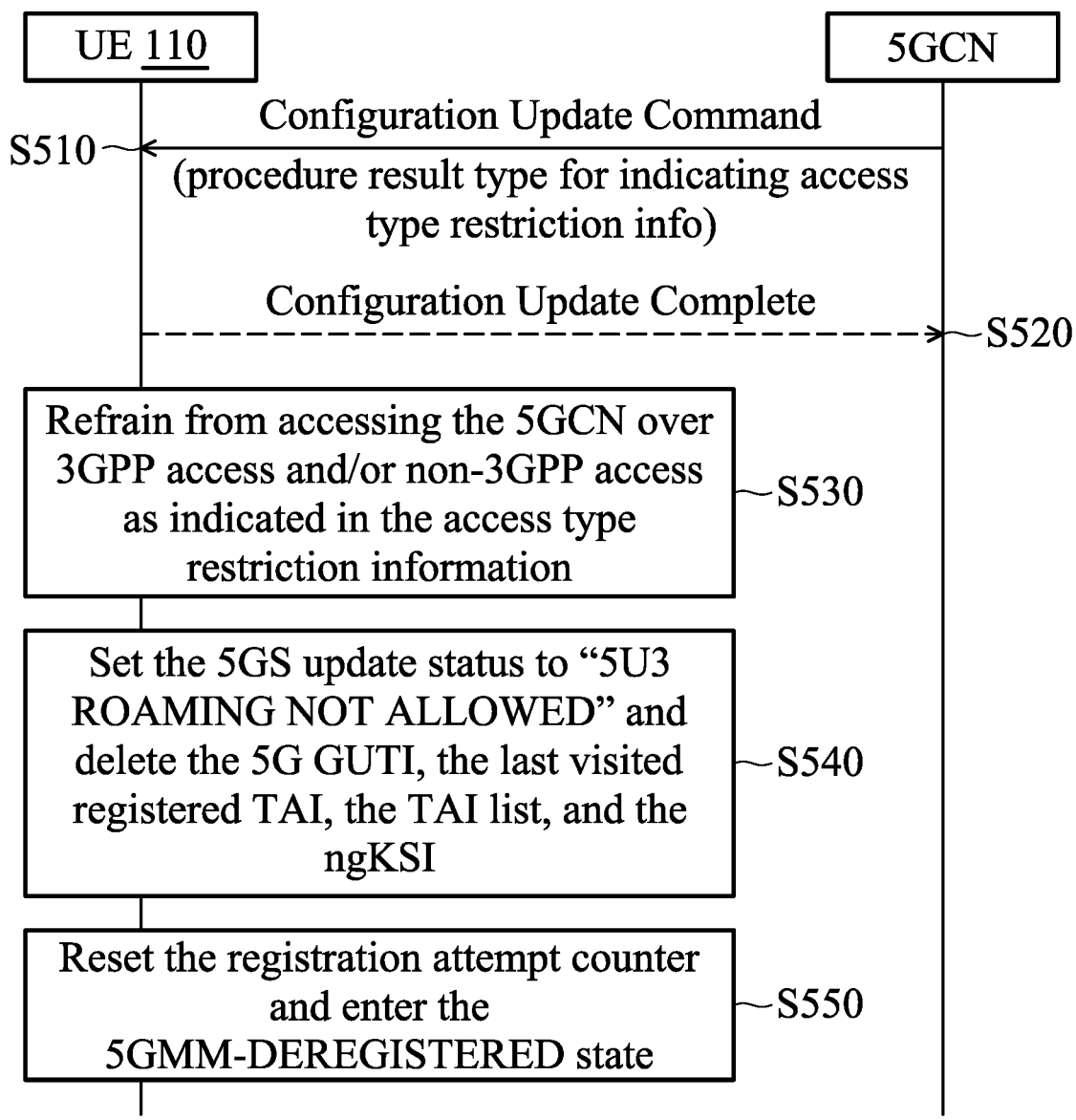
FIG. 5 is a message sequence chart illustrating the handling of access type restriction information according to another embodiment of the application.

FIG. 5 is a message sequence chart illustrating the handling of access type restriction information according to another embodiment of the application.

To begin with, the UE 110 receives a Configuration Update Command message from the 5GCN (step S510), and in response the UE 110 may or may not reply to the 5GCN with a Configuration Update Complete message (step S520), depending on whether acknowledgement requested is indicated in the Configuration Update Command message.

In particular, the Configuration Update Command message may include access type restriction information. For example, the Configuration Update Command message may include a procedure result type (similar to the 5G registration result IE) to indicate the access type restriction information.

In response to receiving a Configuration Update Command message including access type restriction information, the UE 110 is refrained/stopped from accessing the 5GCN over 3GPP access and/or non-3GPP access as indicated in the access type restriction information (step S530).

Next, the UE 110 sets the 5GS update status to "5U3 ROAMING NOT ALLOWED" and deletes the 5G GUTI, the last visited registered TAI, the TAI list, and the ngKSI (step S540).

Additionally, the UE 110 resets the registration attempt counter and enters the 5GMM-DEREGISTERED state (step S550).

In view of the forgoing embodiments, it will be appreciated that the present application realizes control of a UE accessing the 3GPP core network over certain access type (s), by providing access type restriction information to the UE during a registration procedure or a configuration update procedure, or in a USIM file. Advantageously, the 3GPP core network may prevent UE(s) from attempting to connect over certain access type(s), and may steer UE(s) to use an alternative access type (i.e., inform UE(s) of using an alternative access type).

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

What is claimed is:

1. A User Equipment (UE), comprising:
a wireless transceiver, configured to perform wireless transmission and reception to and from one or both of a 3rd Generation Partnership Project (3GPP) access network and a non-3GPP access network; and
a controller, configured to obtain information indicating that the UE is not allowed to access a 3GPP core network over the non-3GPP access network, and access the 3GPP core network over the 3GPP access network based on the obtained information;
wherein the controller is further configured to perform the following in response to the 3GPP core network being a 5G Core Network (5GCN) and the information indicating that the UE is not allowed to access the 3GPP core network over the non-3GPP access network:
setting a 5GS update status to "5U3 ROAMING NOT ALLOWED"; and
deleting a 5G Globally Unique Temporary UE Identity (GUTI), a last visited registered Tracking Area Identity (TAI), a TAI list, and a Key Set Identifier for Next Generation Radio Access Network (ngKSI);
wherein the information is obtained from a response message of a registration procedure or a configuration update command received from the 3GPP core network, or from subscription data stored in the UE.

2. The UE of claim 1, wherein the refraining of the UE from accessing the 3GPP core network over the non-3GPP access network comprises: disabling an N1 mode capability of the UE for the non-3GPP access network.

3. The UE of claim 1, wherein the response message is a Registration Reject message of a 5G Mobility Management (MM) Registration procedure, and the information is a 5GMM cause, and the controller is further configured to reset a registration attempt counter and enter a 5GMM-DEREGISTERED state in response to the information indicating that the UE is not allowed to access the 3GPP core network over the non-3GPP access network.

4. The UE of claim 1, wherein the response message is a Registration Accept message of a 5G Mobility Management (MM) Registration procedure, and the information is a 5G registration result.

5. The UE of claim 1, wherein the subscription data is a Universal Subscriber Identity Module (USIM) file.

6. The UE of claim 1 wherein the controller is further configured to store the information in a Universal Subscriber Identity Module (USIM) or a memory, in response to the information being obtained from the response message or the configuration update command.

7. The UE of claim 6, wherein the information is stored permanently or only for a period of time.

8. The UE of claim 6, wherein the controller is further configured to determine that the information is valid until the UE is powered off, or until the USIM is changed, or until a location of the UE is changed.

9. A method for handling access type restriction information, executed by a UE communicatively connected to a 3rd Generation Partnership Project (3GPP) core network over one or both of a 3GPP access network and a non-3GPP access network, the method comprising:
  obtaining information indicating that the UE is not allowed to access the 3GPP core network over the non-3GPP access network; and
  accessing the 3GPP core network over the 3GPP access network based on the obtained information;
  in response to the 3GPP core network being a 5G Core Network (5GCN) and the information indicating that the UE is not allowed to access the 3GPP core network over the non-3GPP access network,
  setting a 5GS update status to "5U3 ROAMING NOT ALLOWED"; and
  deleting a 5G Globally Unique Temporary UE Identity (GUTI), a last visited registered Tracking Area Identity (TAI), a TAI list, and a Key Set Identifier for Next Generation Radio Access Network (ngKSI),
  wherein the information is obtained from a response message of a registration procedure or a configuration update command received from the 3GPP core network, or from subscription data stored in the UE.

10. The method of claim 9, further comprising: refraining the UE from accessing the 3GPP core network over the non-3GPP access network, by disabling an N1 mode capability of the UE for the non-3GPP access network based on the obtained information.

11. The method of claim 9, wherein the response message is a Registration Reject message of a 5G Mobility Management (MM) Registration procedure, and the information is a 5GMM cause, and the method further comprising:
  resetting a registration attempt counter and entering a 5GMM-DEREGISTERED state in response to the information indicating that the UE is not allowed to access the 3GPP core network over the non-3GPP access network.

12. The method of claim 9, wherein the response message is a Registration Accept message of a 5G Mobility Management (MM) Registration procedure, and the information is a 5G registration result.

13. The method of claim 9, wherein the subscription data is a Universal Subscriber Identity Module (USIM) file.

14. The method of claim 9, further comprising:
  storing the information in a Universal Subscriber Identity Module (USIM) or a memory, in response to the information being obtained from the response message or the configuration update command.

15. The method of claim 14, wherein the information is stored permanently or only for a period of time.

16. The method of claim 14, further comprising:
  determining that the information is valid until the UE is powered off, or until the USIM is changed, or until a location of the UE is changed.

* * * * *